G. H. GIBSON.
SLIDE RULE.
APPLICATION FILED OCT. 18, 1909.
980,412.
Patented Jan. 3, 1911.
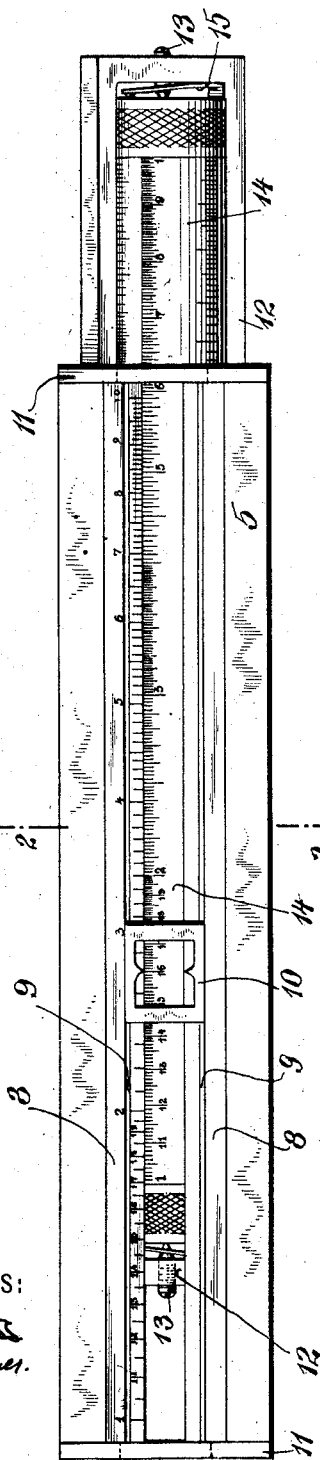
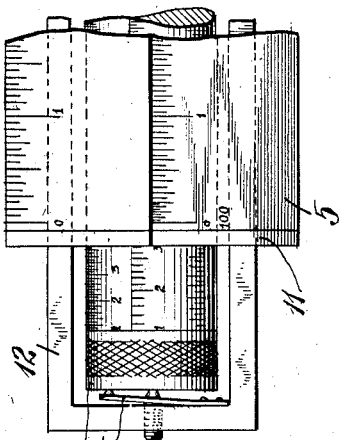
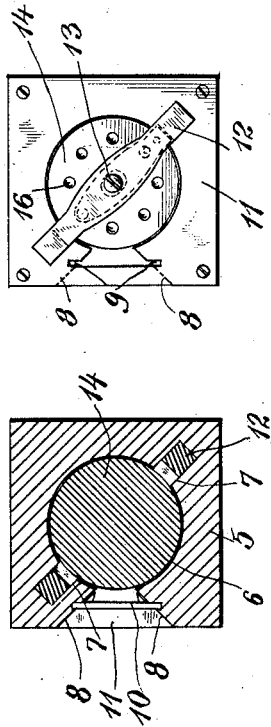

UNITED STATES PATENT OFFICE.

GEORGE H. GIBSON, OF MONTCLAIR, NEW JERSEY.

SLIDE-RULE.

980,412.  Specification of Letters Patent.  Patented Jan. 3, 1911.

Application filed October 18, 1909. Serial No. 523,310.

*To all whom it may concern:*

Be it known that I, GEORGE H. GIBSON, a citizen of the United States, residing at Montclair, in the county of Essex and State of New Jersey, have invented certain new and useful Improvements in Slide-Rules, of which the following is a specification.

This invention relates to slide-rules and is directed to the provision of an instrument of that character so constructed as to greatly extend its field of usefulness and to greatly facilitate the making of mathematical calculations.

My improved slide-rule is so constructed that with a single setting of the slide thereof a plurality of results may be obtained. This is accomplished by providing a plurality of scales on one member of the rule any one of which may be brought into coaction with a coöperating scale on the other member of the rule without occasioning a change in the relative lengthwise positions of the members found when setting the instrument for a reading.

In the preferred embodiment of my invention, the rule consists of a pair of members one of which may be moved in the direction of its length relatively to the other and also may be rotated while being held against movement in the direction of its length; this rotatable member is provided with a plurality of scales thereon and, by rotating it, any one of these scales may be brought into coaction with the scale on the other member. With each scale on the rotatable member and a scale on the other member, a mathematical calculation may be performed and the several scales may be so laid off as to permit of making the calculations which are most frequently required. In this way the instrument may be set by moving the rotatable member in the direction of its length relatively to the other member, and with this one setting of the instrument, a plurality of readings may be made, one for each scale on the rotatable member which is brought into coaction with a scale on the coöperating member.

The construction which I prefer to employ comprises a stock, a frame slidable therein, and a cylindrical slide mounted for rotation within the frame, the slide having a plurality of scales laid out thereon and the stock having one or more scales thereon with which those on the slide coöperate. Preferably, the frame fits rather tightly within an opening in the stock, so that when it and the slide which it carries have been positioned lengthwise relatively to the stock, there will be no danger of accidental movement of the slide. Also, means may be provided for holding the slide against unintended rotational movement.

I have illustrated the preferred embodiment of my invention in the accompanying drawings in which—

Figure 1 is an elevation of the rule, Fig. 2 is a section on line 2—2 of Fig. 1, Fig. 3 is an end view, and Fig. 4 is a perspective view of one end of the rule.

Referring to these drawings, the stock of the rule is indicated at 5, this consisting of a member of rectangular cross-section having a cylindrical bore 6 running lengthwise thereof. At opposite sides of the cylindrical bore are grooves 7 extending lengthwise of the stock. On one or more sides, the stock is cut to provide a slot extending from the exterior of the stock to the cylindrical bore and the sides 8 of this slot are preferably inclined as shown. A scale is applied to each of the faces 8 in the usual or any suitable manner; these faces 8 may also have grooves 9 cut therein and adapted to receive the lateral edges of a runner 10 of the usual construction including a light metallic frame and pointers thereon or a glass therein, the latter having a straight line drawn thereon. In the drawings, but one slot having scales on its side walls is shown but similar slots may be provided in one or more of the other faces of the stock to increase the capacity of the instrument; in the latter case, I prefer to provide metallic end-pieces or bands 11 at the ends of the stock to firmly unite the parts thereof.

The grooves 7 receive the side members of a frame 12 which is adapted to slide back and forth in these grooves; the side members of the frame fit snugly in the grooves 7 so that the frame will be held by friction against unintended movement relatively to the stock. In the end members of the frame 12 are adjustable screws 13 forming pivot-pins on which a cylindrical slide 14 is rotatably mounted. The slide 14 lies within the bore in the stock and is of approximately the same size as the bore. The ends of the slide are preferably knurled as shown to facilitate rotating the slide relatively to the stock. To one of the end members of the frame 12 may be secured a leaf spring 15 carrying on its free end a stud adapted to enter any one of a plurality of depressions 16 formed in the end of the slide 14 to restrain the slide against rotational movement. On the cylindrical surface of the slide 14 and extending lengthwise of the slide are a plurality of scales, these being applied to the slide in any suitable manner as by marking the scales on thin strips and securing these strips to the surface of the slide.

In using the rule, the frame 12 and the slide carried thereby are moved relatively to the stock with one scale on the slide moving adjacent to one of the scales on the stock; the instrument may thus be set and a reading taken just as is done in using a slide-rule of the ordinary construction. During this operation, the slide will be held from rotating by the spring detent 15. The slide having thus been set, it will be held against lengthwise movement relatively to the stock by the friction between the frame 12 and the walls of the grooves 7. The slide may then be rotated to bring another scale thereon into coaction with the scale on the stock and another reading may then be made without having to reset the instrument. This may be repeated using each of the several scales on the slide. These scales may be such as to permit of making the calculations most often required, as for instance in using the square, cube, square root, cube root, logarithm, anti-logarithm, sine, tangent, reciprocals, folded-scales, logarithms of logarithms, etc. Thus a number of different mathematical operations may be performed with reference to a single number or amount as a base, the instrument being set only once, since the rotation of the slide to bring different scales on the slide and stock into coaction may be effected while the slide is held against lengthwise movement relatively to the stock. Another advantage incident to the use of this form of rule is that where a number of mathematical operations are to be performed, each using the result obtained by the preceding one, the intermediate results need not always be read off; thus, not only is time saved, but also the possibility of error in making the reading and in adjusting the slide to correspond therewith for the next reading is avoided. Instead of stopping to read the intermediate result, the slide may be rotated to bring up the proper scale for the next operation, and when so rotated it will be properly set since longitudinal movement of the slide during its rotation was precluded. Furthermore, by the provision of an inverted scale on the slide, the instrument may always be so used that the result of a first operation will appear on a scale of the stock at a point opposite the zero mark on the coacting scale of the slide, and therefore the succeeding operation will be more readily performed since, after rotating the slide, the measurement along the scale thereof will be from the zero point. Also, by the use of folded scales, the result of the second operation may be obtained by rotating the slide but without resetting it longitudinally. It will thus be seen that in many cases a slide-rule constructed as herein described may be used without a second longitudinal setting of the slide for continued operations, this being due to the fact that any scale on the slide may be brought opposite a scale on the stock without losing the longitudinal adjustment of the slide with respect to the stock.

To further extend the usefulness of the rule, the edges of the stock may be marked off as indicated in Fig. 4 to form draftsmen's scales.

Having described my invention what I claim as new therein and desire to secure by Letters Patent of the United States is:—

1. A slide-rule comprising a stock having a scale, a frame movable lengthwise relatively thereto, and a slide rotatable in said frame to bring any one of a plurality of scales thereon into coaction with a scale on the stock, substantially as set forth.

2. A slide-rule comprising a stock having a scale and provided with a lengthwise bore, a lengthwise slot extending into said bore and openings extending parallel to said bore, a frame having parts entering said openings and slidable relatively to the stock, and a cylindrical slide mounted for rotation in said frame and lying in said bore, said slide having a plurality of scales thereon adapted to coact with a scale on the stock adjacent to said slot, substantially as set forth.

3. A slide-rule comprising two members which are relatively movable lengthwise thereof and one of which is rotatable, coacting scales on said members, and means for checking lengthwise movement of said rotatable member relatively to the other member while permitting rotation thereof, substantially as described.

4. A slide-rule comprising a stock having a scale, a frame movable lengthwise relatively thereto, a slide rotatable in said frame, and a plurality of scales on the slide adapted to be brought into coaction with the scale on the stock, and means for restraining the slide against rotational movement, substantially as set forth.

This specification signed and witnessed this 12th day of October, 1909.

GEORGE H. GIBSON.

Witnesses:
 Geo. F. Fenno,
 Frank J. McMahon.